(12) United States Patent
Feng et al.

(10) Patent No.: US 10,185,911 B1
(45) Date of Patent: Jan. 22, 2019

(54) DYNAMICALLY INTERACTIVE RFID TAG WITH OPTICAL CONTROL

(71) Applicants: Simin Feng, Oxnard, CA (US); Kevin A. Boulais, La Plata, MD (US); Robert B. Nichols, Yorktown, VA (US); Victor H. Gehman, Jr., Dahlgren, VA (US)

(72) Inventors: Simin Feng, Oxnard, CA (US); Kevin A. Boulais, La Plata, MD (US); Robert B. Nichols, Yorktown, VA (US); Victor H. Gehman, Jr., Dahlgren, VA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/866,510

(22) Filed: Jan. 10, 2018

(51) Int. Cl.
*G06K 19/07* (2006.01)
*G06K 19/077* (2006.01)
*G06K 7/10* (2006.01)

(52) U.S. Cl.
CPC ........... *G06K 19/0726* (2013.01); *G06K 7/10* (2013.01); *G06K 19/077* (2013.01)

(58) Field of Classification Search
CPC ............................ A42B 3/046; A61B 2503/10
USPC ........................................................ 340/13.26
See application file for complete search history.

(56) References Cited

U.S. PATENT DOCUMENTS

| 2013/0127060 A1* | 5/2013 | Aboush | H01L 23/5223 257/773 |
| 2014/0298921 A1* | 10/2014 | Surapaneni | G01L 1/146 73/862.041 |
| 2016/0050999 A1* | 2/2016 | Atashbar | A42B 3/046 2/411 |

* cited by examiner

*Primary Examiner* — Fabricio R Murillo Garcia
(74) *Attorney, Agent, or Firm* — Gerhard W. Thielman, Esq.

(57) ABSTRACT

A radio frequency identifier (RFID) tag is provided for receiving and reflecting electromagnetic energy at select frequency bands of visible and infrared wavelengths. The RFID tag includes an electrically conductive backplane; a dielectric substrate disposed on the backplane; a light guide film (LGF) disposed on the substrate, and metamaterial elements. The LGF has an exposed surface segregated into domains. The metamaterial devices are disposed on a domain. Each device is tuned to respond to a corresponding frequency among the select frequency bands.

4 Claims, 3 Drawing Sheets

| ID1 | $f_1$ | $f_2$ | $f_3$ | $f_4$ |
| --- | --- | --- | --- | --- |
| ID2 | $f_1$ | $f_2$ | $f_3$ | $f_5$ |
| ID3 | $f_1$ | $f_2$ | $f_4$ | $f_5$ |
| ID4 | $f_1$ | $f_3$ | $f_4$ | $f_5$ |
| ID5 | $f_2$ | $f_3$ | $f_4$ | $f_5$ |

DYNAMICALLY INTERACTIVE RFID TAG WITH OPTICAL CONTROL

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to radio frequency identification (RFID) tags. In particular, RFID tags able to respond to select first frequencies by reflection at select second frequencies.

Radio-Frequency IDentification (RFID) technology receives growing attention worldwide in a broad range of applications. RFID becomes one of the key elements to interface objects in the physical world. Many conventional RFID tags are passive and static. The communications between tags and readers are accomplished by electromagnetic waves of radio frequency. The reader's antenna sends the electromagnetic signal to the tag. The tag's antenna receives the signal and reflects the modified electromagnetic wave back to the reader. Then the reader receiver picks up the tag's radio waves and interprets the information as meaningful data. Static RFID is vulnerable, being susceptible to be detected, and the information being transmitted cannot be altered.

For some applications, a desirable capability enables the RFID code of the target can be changed dynamically. This type of RFID can avoid detection by an adversary to thereby enhance the capability of identifying friend and foe (IFF). Dynamic RFID tags use microchips to store data that are retransmitted when interrogated. Often the RFID tag is powered by the radio frequency (RF) signal received, but sometimes they are powered by batteries or other means. The information of the identification (ID) is coded in the modulation provided by the microchip. Each modulated signal corresponds to a unique identification that can be changed dynamically in response to different interrogators, for example.

SUMMARY

Conventional RFID tags yield disadvantages addressed by various exemplary embodiments of the present invention. In particular, various exemplary embodiments provide a radio frequency identifier (RFID) tag for receiving and reflecting electromagnetic energy at select frequency bands of visible and infrared wavelengths. The RFID tag includes an electrically conductive backplane; a dielectric substrate disposed on the backplane; a light guide film (LGF) disposed on the substrate, and metamaterial elements. The LGF has an exposed surface segregated into domains. The metamaterial elements are disposed on a domain. Each element is tuned to respond to a corresponding frequency among the select frequency bands.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

The disclosure generally employs metric units with the following abbreviations: length in millimeters (mm), time in seconds (s), force in newtons (N), frequency in gigahertz (GHz), resistance in ohms (Ω), capacitance in picofarrads (pF), and power in decibels (dB).

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), digital signal processor (DSP) or other related component.

Exemplary embodiments provide to a technique to dynamically vary a radio frequency identification (RFID) tag based on reflector array of tunable meta-resonators. Depending on application and operational environment, such an exemplary device can be interactively tuned either through infrared interrogation or light guide film (LGF) based on reflector array of tunable meta-resonators. Dynamical RFID is useful for identification (ID) switch and can interchange during operations to enhance the identifying friend and foe (IFF) as an example capability. The design concept is also applicable for electrical tuning.

Figure 1:
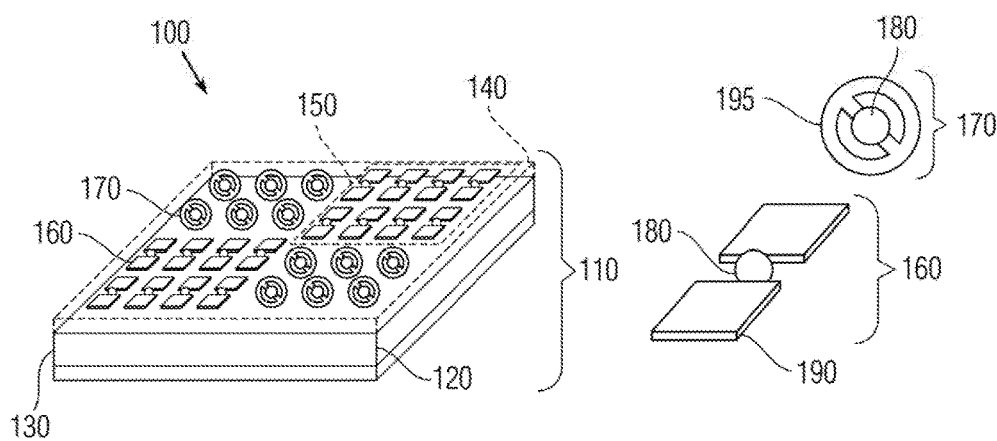
FIG. 1 is a isometric view of an RFID tag.

FIG. 1 shows a schematic diagram view 100 of an exemplary thin-film optical tuning RFID device 110 shown on the left side. A conductive backplane 120 supports a dielectric substrate layer 130 described in patent application Ser. No. 15/641,657 (Navy Case 102775), incorporated herein by reference. A metamaterial LGF 140 can be deposited on the substrate layer 130 and be divided into separate domains 150 comprising arrays of metamaterial devices (or meta-atoms) 160 and 170, each of which includes a photosensitive element 180. The meta-atoms 160 and 170 function as photo-induced switches and can be phased-array reflector cells disposed in arrays grouped within their respective domains 150 on the LGF 140.

Details of the patch meta-atoms 160 and loop meta-atoms 170 are shown on the right side of view 100. The patch meta-atoms 160 include patches 190 connected by the photosensitive element 180, while the loop meta-atoms 170 include a loop 195 with terminals connected by the element 180. In the configuration shown, the thin-film tunable RFID device 110 includes four domains 150 atop the LGF 140 with separate arrays of meta-atoms 160 and 170. Each segregated domain 150 contains sub-wavelength arrays of metamaterial elements (meta-resonators) deposited above the substrate layer 130 and the metal backplane 120.

Photo-variable material ink or any type of photosensitive material can be printed as part of the meta-atoms 160 and 170 to alter their characteristics. The LGF 140 can be disposed either on the top (as shown) or at the bottom of the dielectric layer 130 to form a frequency-selective metasurface. The RFID's structure can also be multilayers, i.e., light guide films and dielectric spacers interleave with metamaterial layers.

The conductive backplane 120 can be composed of an electrically conductive metal, for example copper (Cu), gold (Au), silver (Ag) and aluminum (Al). The dielectric layer 130 can be formed by various materials such as FR-4, being a glass-reinforced laminate epoxy, which is low cost but lossy at high frequencies. Alternatively, a polymer could be used for the dielectric layer 130. For optical tuning, the LGF 140 is disposed over the substrate layer 130.

The meta-atoms 160 and 170 can be disposed on the LGF 140. The exemplary device 160 includes the photosensitive element 180 that connects two flanking patches 190. The element 180 can be formed from photo-capacitive ink. Alternatively, the element 180 can be based on any of electric, optical, thermal, piezo, liquid crystal, phase transition material and micro-electromagnetic system (MEMS) configurations.

The photosensitive element 180 controls the state of the meta-atoms 160 and 170, each of which has a pair of phase states. The patches 190 and loops 195 provide first and second terminals and are composed of a conductive metal, such as copper (Cu) or gold (Au). The terminals resonate from visible or infrared electromagnetic energy imparted between them from an interrogation source. The design of the RFID tag 110 represents only one of many types that can be implemented. Other designs include but are not limited to cross structures, pad structures, mushroom structures in which a via connects a corresponding location on the meta-atom 160 or 170 to the backplane 120, or inverses of the structures in which the non-metallic regions and metallic regions are reversed.

The meta-atoms 160 and 170 are preferably ultrathin. The patch domain 150 is composed of metallic elements deposited on the substrate layer 130 as a dielectric. Each meta-atom 160 or 170 is bridged by a nanocomposite material so as to provide the switch function whose capacitance can be tuned by light, such as a photo-capacitive ink. The dielectric layer 130 is absorptive when the RFID 110 is used as a passive reflector array for beam deflection and steering. For active phased array antenna usage, the dielectric layer 130 should be low or non-absorptive and the antenna receives signals by techniques to those skilled in the art of antenna designs. For clarity, rectangular metallic patches 190 connected by elements 180 are shown to represent the meta-atoms 160 and 170. However, artisans of ordinary skill will recognize that the shape of the metallic elements is immaterial, provided that the metallic elements can strongly reflect the electromagnetic waves.

Depending on applications and design strategies, the RFID tag 110 can be either passive or active and can be either optically tuned or electrically tuned. The RFID tag 110 contains a set of preregistered frequencies that serve as the quiescent coding mechanism, each frequency being tuned corresponding to individual meta-atoms 160 and 170. The resonant frequency of each domain can be tuned dynamically in response to the in situ environments and scenes. Different combinations of the preregistered resonant frequencies provide a set of unique identifications for different environments and scenes. In optically tuning, either visible or infrared light can be used to control the interaction depending on applications. Additionally, because both time and space can be controlled optically, one can reflect the information basically in one direction (center lobe of radiation pattern) from the RFID tag 110. This is useful for discrete interrogation because the response would be directional, which can aid in military communications.

Exemplary embodiments describe a technique for dynamically tuning RFID tags 110 generally by using optical means. A schematic diagram of one realization of, but not limited to, the RFID tag 110 is shown in view 100. The metamaterial layer is composed of several patch domains deposited on the top of a dielectric layer and metal backplane. Each patch domain 150 consists of two-dimensional periodic meta-atoms 160 and 170 with a built-in resonant circuit. Photo-variable material ink or any type of single-crystal photosensitive material for the photosensitive element 180 can be used to tune, or otherwise control the meta-atoms 160 and 170. The resonant-circuit as the meta-atom 160 or 170 and photo-sensitive ink as the element 180 form a tunable meta-circuit. The control light can be introduced through the LGF 140, which can be placed either on the top (as shown) or at the bottom of a metamaterial layer (user controlled) or by an interrogator (interrogator control). This structure can be multilayers with the metamaterial layers, dielectric spacers, and LGFs interleaved.

The optically tuning mechanism is based on optically sensitive material, which can be printed on an array of properly designed resonant unit cells forming meta-resonators. Other optical control mechanisms can also be used. Each meta-resonator behaves as a reactive element or meta-atom that can couple to incident electromagnetic waves of the designed frequency. Photosensitive material can be based on either photo-conductive effect, photo-capacitive effect or photo-inductive effect. The effective dielectric constant of the materials changes with the intensity of the control light, as one example. Other examples could include changed according to the frequency of light. The change of the effective dielectric constant leads to the change of the capacitance of the meta-circuit, and thus changes the resonant frequency.

In view 100, different types of unit cells form different patch domains 150. There are two coupling mechanisms: inductive and capacitive couplings. The coupling mechanism of each domain 150 can be different, i.e., either electric coupling (capacitive coupling, electric field couples to the meta-atoms) or magnetic coupling (inductive coupling, magnetic field couples to the meta-atoms). Separate domains 150 are designed to operate at different frequency bands without overlap. Each domain 150 can be dynamically tuned to resonate at different radio frequencies within its band. The RFID tag 110 includes a set of preregistered radio frequencies which can be changed either optically in real time.

Figure 2:
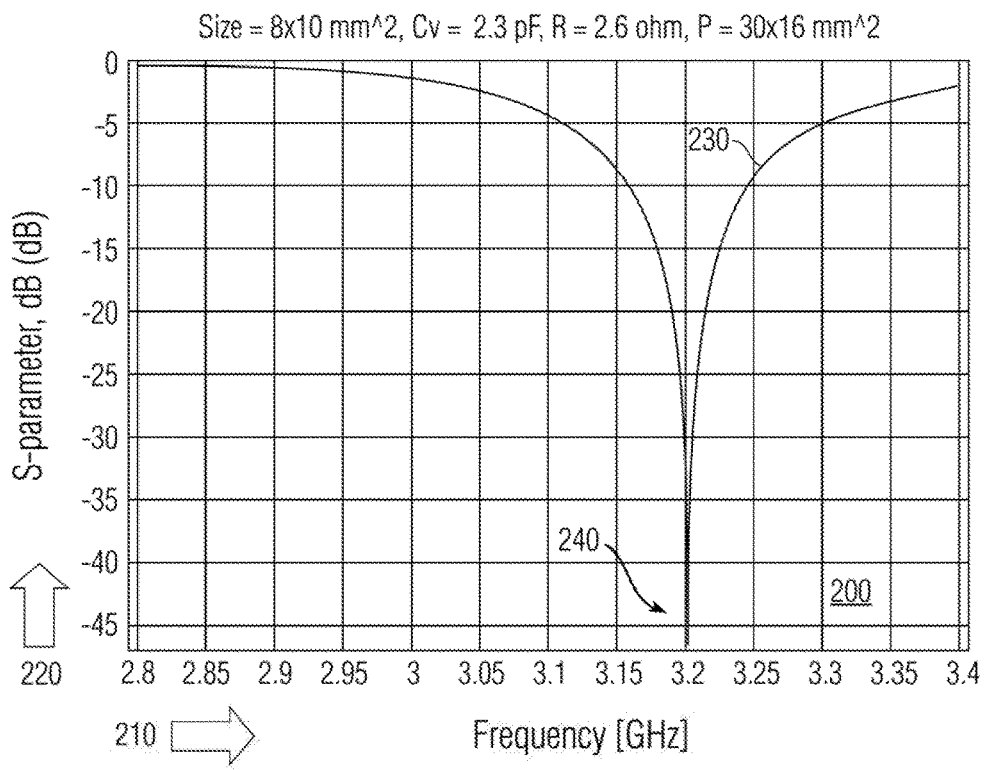
FIG. 2 is a graphical view of a first reflective response.

FIGS. 2 through 5 show graphs of electric field reflections of an RFID tag 110 with meta-atom period of 30 mm for one dimension and 16 mm for the other dimensions on the plane of reflection for particular frequencies tuned in a single frequency band. FIG. 2 shows a graphical view 200 of reflection response to frequency for a first RFID tag 110 having an area of patch of 8 mm×10 mm, capacitance of 2.3 pF, and resistance of 2.6Ω. The abscissa 210 denotes the frequency in gigahertz (GHz), while the ordinate 220 denotes the S-parameter reflection in decibels (dB). The response 230 is plotted showing a cusp 240 at 3.20 GHz.

Figure 3:
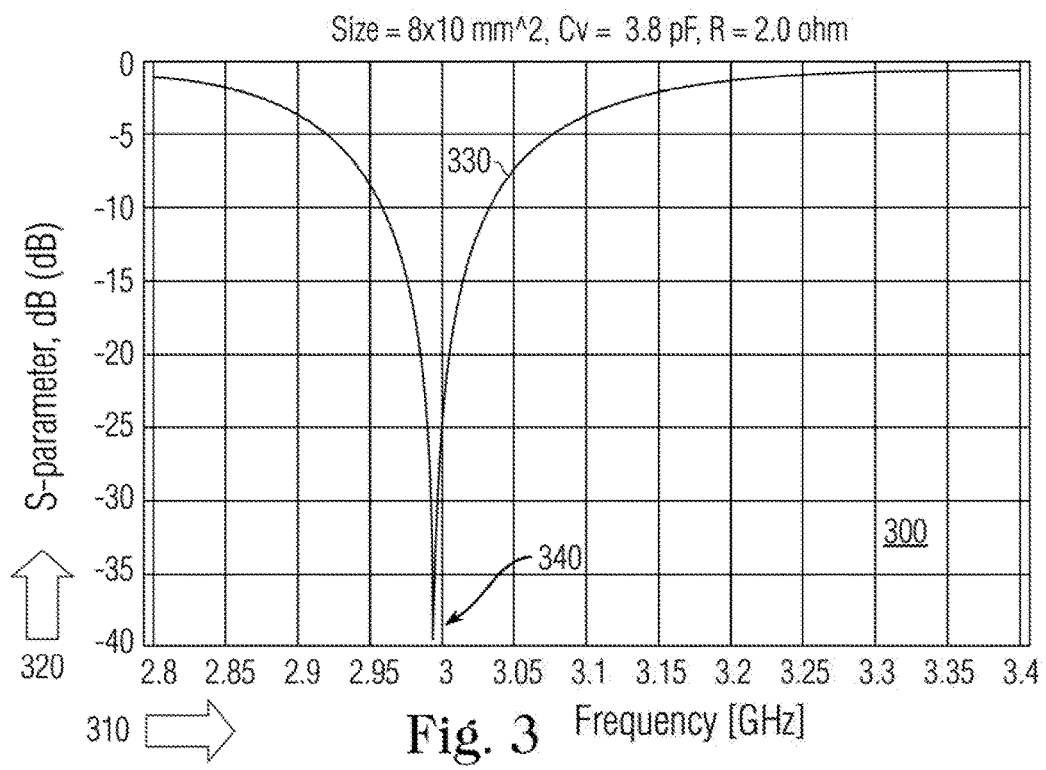
FIG. 3 is a graphical view of a second reflective response.

FIG. 3 shows a graphical view 300 of reflection response to frequency for a second RFID tag 110 having a patch area of 8 mm×10 mm, capacitance of 3.8 pF, and resistance of 2.0Ω. The abscissa 310 denotes the frequency in GHz while the ordinate 320 denotes the S-parameter reflection in dB. The response 330 is plotted showing a cusp 340 at 2.99 GHz.

Figure 4:
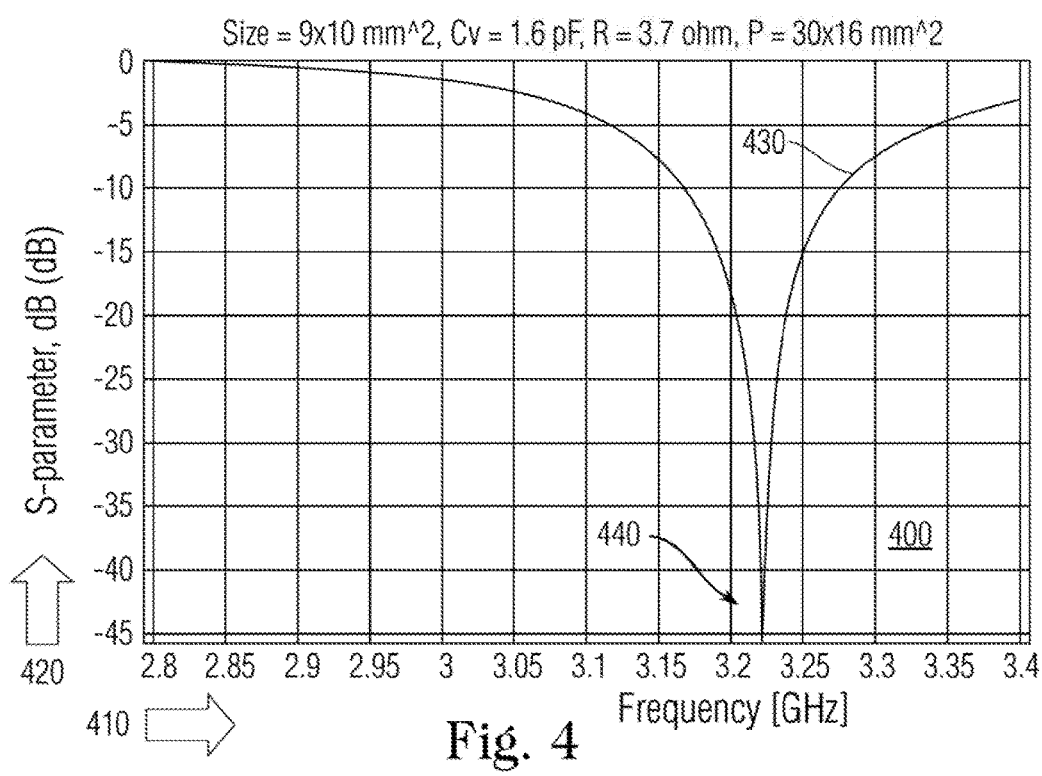
FIG. 4 is a graphical view of a third reflective response.

FIG. 4 shows a graphical view 400 of reflection response to frequency for a third RFID tag 110 having a patch area of 9 mm×10 mm, capacitance of 1.6 pF, and resistance of 3.7Ω. The abscissa 410 denotes the frequency in GHz, while the ordinate 420 denotes the S-parameter reflection in dB. The response 430 is plotted showing a cusp 440 at 3.22 GHz.

Figures 5, 6:
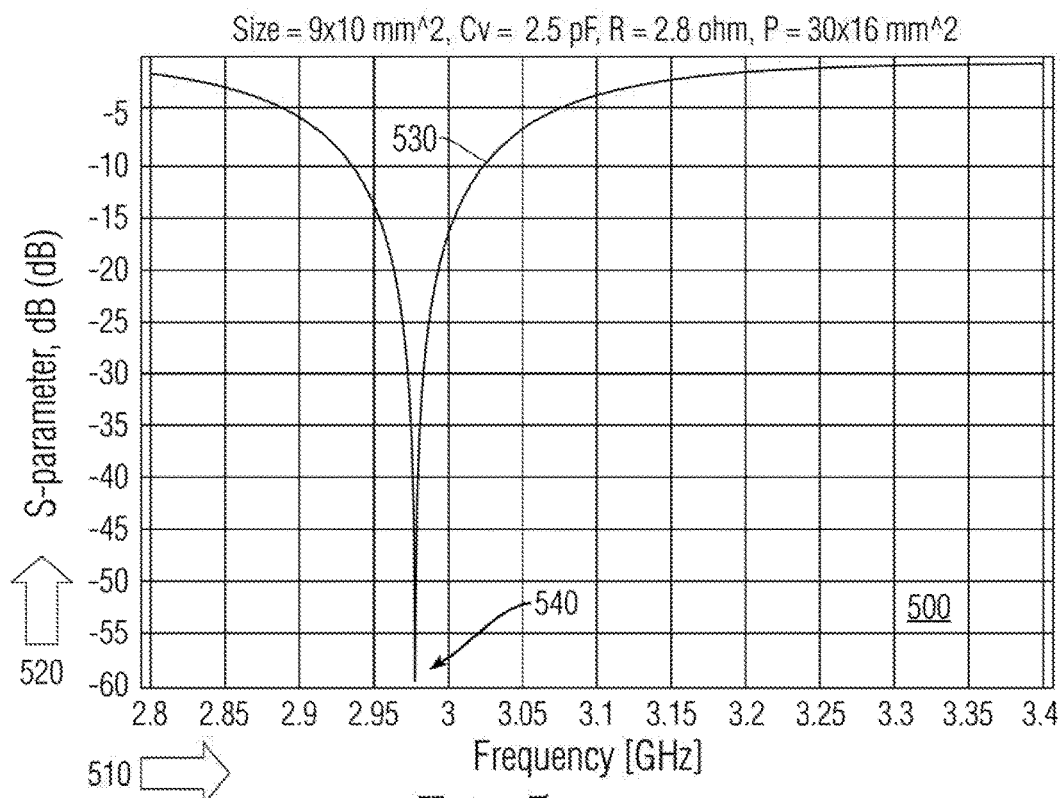
FIG. 5 is a graphical view of a fourth reflective response.
FIG. 6 is a tabular view of identification code and frequency.

FIG. 5 shows a graphical view 500 of reflection response to frequency for a second RFID tag 110 having a patch area of 9 mm×10 mm, capacitance of 2.5 pF, and resistance of 2.8Ω. The abscissa 510 denotes the frequency in GHz, while the ordinate 520 denotes the S-parameter reflection in dB. The response 530 is plotted showing a cusp 540 at 2.98 GHz.

Views 200 and 300 show the tunability of the domain 150 when the patch area is 8 mm×10 mm, whereas views 400 and 500 show the tenability of the domain 150 for a different patch size of the same area of meta-atoms. Each RFID tag 110 is composed of several different types of patch domains and each domain 150 can operate at distinguished frequency band with a set quiescent point. Reflection coefficients of electric fields from one patch domain showing tuned resonances in one frequency band. Each RFID tag 110 can resonate at the several distinguished frequencies. Each frequency corresponds to a uniquely designed domain of meta-atoms 160 and 170.

FIG. 6 shows a schematic tabular view 600 of frequency bands. The leftmost column provides identification (ID) codes, while the remaining columns denote corresponding frequency bands. The RFID tag 110 containing four domains 150 designed into five preregistered distinguished frequency bands can produce five tunable ID codes as shown in view 600. Each ID code can be tuned dynamically through tuning the individual frequency in the ID code. For example, a four-domain RFID tag 110 can be designed into six or seven distinguished frequency bands to produce fifteen or thirty-five ID codes.

In general, an M-domain N-band RFID tag 110 can produce $C_N^M$ numbers of tunable ID codes. As long as the frequency bands of the tags are well separated, the $C_N^M$ numbers of tunable ID codes are uniquely defined. The set of resonant frequencies (RFID code set) is embedded in the return RF signals sending by readers and can be recovered from the inverse Fourier transfer of the return signals.

Operation Modes: For the optical tuning, the RFID tag 110 can operate at three modes: Reader, Target, and Interactive modes.

(1) Reader mode: the interrogator uses infrared laser to control the reflection of the radio wave from the target, so as to tune the RFID return of the target.

(2) Target mode: the target can self-tune its own RFID by controlling the reflection of the radio wave through an embedded optical control circuit, so that the target can control which ID code the operator returns to the reader.

(3) Interactive mode: both the reader and the target can control the reflection by operating at the different digits of the ID code.

For the interactive mode, using an exemplary ID1 in view 600, the frequencies $f_1$ and $f_2$ can be tuned by the target and the frequencies $f_3$ and $f_4$ can be tuned by the reader. This establishes a simple communications channel between the reader and the target. Each domain 150 can be designed to operate at different frequencies and tuning range by changing the pattern, geometric parameters and characteristics of the photosensitive material.

The selection of operation mode depends on the application. The RFID tags 110 in exemplary embodiments can be useful in different environments and combat field operations. In any of the modes, the array formed by multiple domains can be further used to control the direction of radiation from the electromagnetic energy reflected off the RFID tag 110. Although developed for military use, exemplary embodiments can be used for commercial purposes as well. Many RFID devices are used in the commercial world, e.g., tracking of store items, toll booth passes, etc. The dynamic and interactive RFID tag 110 can also be applied to medical surveillance.

The exemplary RFID tag 110 was developed from ILIR, NISE, and Tunable Electromagnetic Metamaterials (TEM3) programs and potentially has both military and civilian applications. An advantage of this invention is that each digit in the RFID code can be tuned and optically controlled by either reader or target or both. There would be no electromagnetic interference (EMI) effect.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A radio frequency identification (RFID) tag for receiving and reflecting electromagnetic energy at select frequency bands, said energy having at least both visible and infrared wavelengths, said RFID tag comprising:
   an electrically conductive backplane;
   a dielectric substrate disposed on said backplane, said substrate comprising glass-reinforced laminate epoxy;
   a metamaterial layer disposed on said substrate;
   a light guide film (LGF) disposed on said metamaterial layer, said LGF having an exposed surface segregated into a plurality of domains; and
   a plurality of metamaterial devices disposed on each domain of said plurality of domains, wherein each device responds to a corresponding frequency among the select frequency bands and includes a photosensitive element that links first and second terminals of said element.

2. The RFID tag according to claim 1, wherein said backplane is composed of at least one of copper (Cu), gold (Au), silver (Ag) and aluminum (Al).

3. The RFID tag according to claim 1, wherein said each domain responds to a receiver frequency and replies at a reflection frequency.

4. The RFID tag according to claim 1, wherein said element is composed from photo-capacitive ink.

* * * * *